United States Patent [19]
Dillman

[11] Patent Number: 5,507,312
[45] Date of Patent: Apr. 16, 1996

[54] BALL CHECK VALVE

[76] Inventor: Charles M. Dillman, 620 Dumbarton, Shreveport, La. 71106

[21] Appl. No.: 310,922

[22] Filed: Sep. 21, 1994

Related U.S. Application Data

[62] Division of Ser. No. 208,338, Mar. 8, 1994, abandoned.

[51] Int. Cl.$^6$ ................................................. F16K 15/04
[52] U.S. Cl. ................................................. 137/533.15
[58] Field of Search ........................... 137/519.5, 533.11, 137/533.13, 533.15

[56] References Cited

U.S. PATENT DOCUMENTS

| | | | |
|---|---|---|---|
| 960,944 | 6/1910 | Johnson | 137/519.5 |
| 1,777,539 | 10/1930 | Yerkes . | |
| 2,085,360 | 6/1937 | Hammett | 251/121 |
| 2,137,402 | 11/1938 | Hoferer | 137/533.15 X |
| 2,274,968 | 3/1942 | O'Barrion | 251/121 |
| 2,937,659 | 5/1960 | Harris et al. | 137/533.13 |
| 3,219,057 | 11/1965 | Knowles | 137/539 |
| 3,724,496 | 4/1973 | Secrist | 137/533.13 |
| 3,827,122 | 8/1974 | Douglas | 29/157.1 R |
| 4,070,237 | 1/1978 | Woodward | 137/533.15 X |
| 4,091,839 | 5/1978 | Donner | 137/533.13 |
| 4,243,067 | 1/1981 | Rubey | 137/329.03 |
| 4,674,529 | 6/1987 | Ferguson | 137/375 |

*Primary Examiner*—Robert G. Nilson
*Attorney, Agent, or Firm*—John M. Harrison

[57] ABSTRACT

A ball check valve including a valve cage having at least three elongated rods longitudinally disposed in the valve cage wall and extending into the cage interior for contacting the ball to prevent wearing of the cage wall when the ball moves back and forth in the cage responsive to fluid flow through the cage and check valve. In a preferred embodiment eight such rods are rotatably disposed in respective rod cavities provided in spaced relationship with respect to one another in the valve cage wall, to present a varying contact surface on the rods as the ball moves in the cage and thus prolong the life of the rods. In a second embodiment, the rods are fixedly mounted in the respective rod cavities.

4 Claims, 1 Drawing Sheet

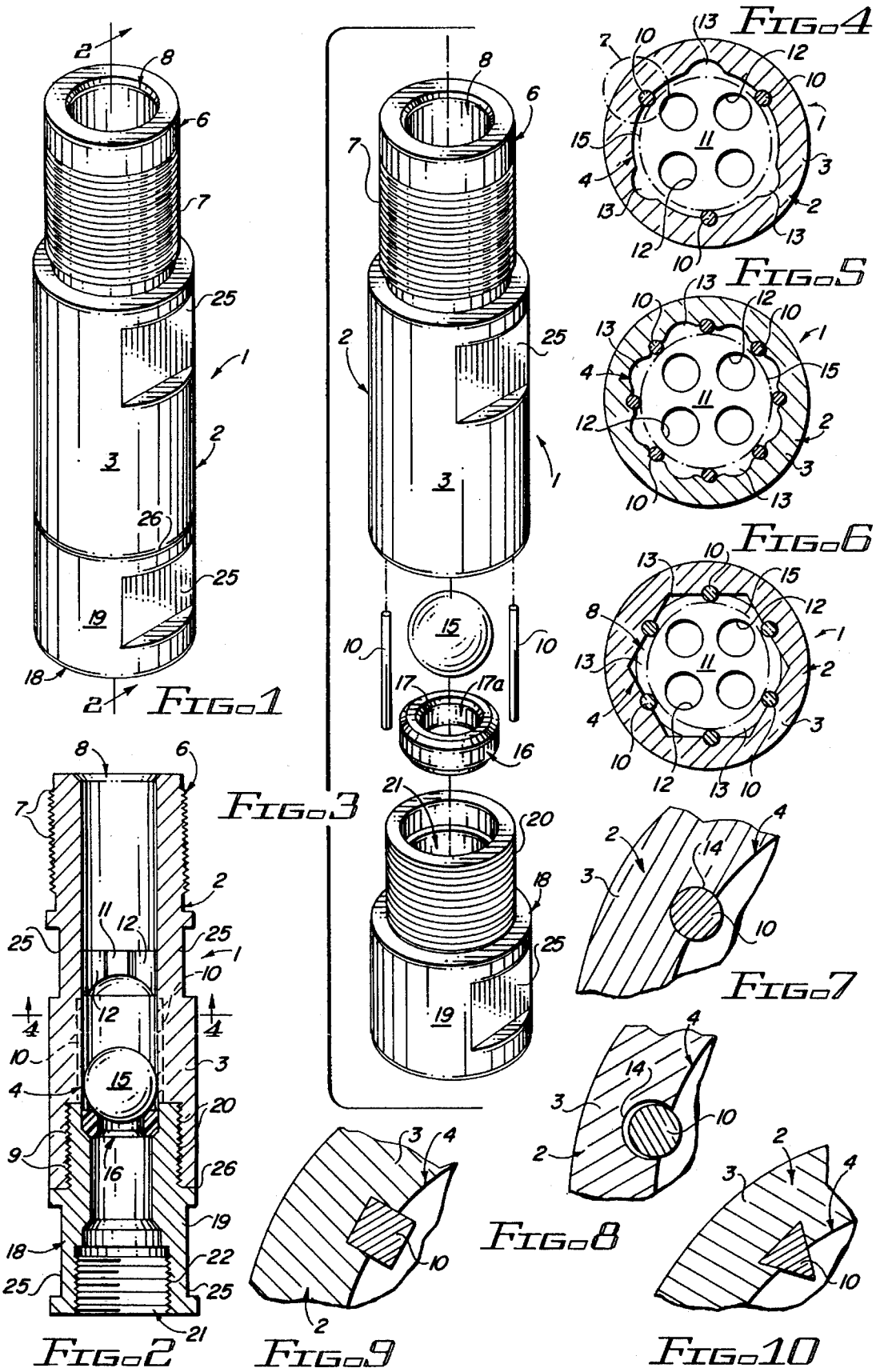

BALL CHECK VALVE

This is a divisional of application Ser. No. 08/208,338 filed on Mar. 8, 1994, now abandoned.

BACKGROUND OF THE INVENTION

1. Field of the Invention

This invention relates to check valves and more particularly, to a ball check valve including a valve cage having at least three rods longitudinally spaced in the cage wall and extending longitudinally into the cage interior for contacting the ball to prevent wearing of the cage wall and minimize ball wear when the ball moves back and forth in the cage responsive to fluid flow through the cage and check valve. In a preferred embodiment the rods are spaced equidistant from each other around the circumference of the cage interior and are rotatably disposed in respective rod cavities provided longitudinally in the cage wall. The rotating action of the contact rods presents a varying contact surface to the moving ball and thus prolongs the life of the contact rods, as well as the stabilized ball. In a most preferred aspect of the invention, eight contact rods are spaced equally around the circumference of the valve cage wall to guide the ball in its back-and-forth movement in the cage and prevent excessive ball oscillation. In a second preferred embodiment of the invention, the contact rods are fixedly mounted in the respective rod cavities.

2. Description of the Prior Art

Various types of check valves utilizing a movable ball are known in the art. U.S. Pat. No. 1,777,539, dated Oct. 7, 1930, to John A. Yerkes, discloses a "Valve Cage", characterized by an annular valve seat including two diametrically-spaced arms extending upwardly therefrom to mount on a spider joint. Two additional diametrically-spaced arms extend downwardly from the spider joint and terminate above the valve seat. The spider joint is centrally bored and provided with interior joint threads for engaging respective pipe threads provided on a pipe. A ball vertically movably disposed between the arms of the cage allows unidirectional flow of fluid through the valve seat, valve cage and spider joint and into the pipe threaded into the spider joint. The ball prevents backflow of fluid from the pipe through the valve cage by blocking the fluid opening in the valve seat. U.S. Pat. No. 2,085,360, dated Jun. 29, 1937, to David M. Hammett, discloses a "Pump Valve Construction" characterized by a cylindrical valve cage including a centrally-disposed fluid passage traversing the length thereof. A valve guide mounted in the passage includes an annular lower portion fitted tightly against the wall of the passage to effect a fluid-type seal with the passage. A valve seat is provided in the passage below the valve guide and a bushing is threaded into the lower end of the valve cage member to press the valve seat against the valve guide. Threads provided on the exterior circumference of the upper end of the valve cage allow threadable attachment of the valve cage to a pipe. A ball valve vertically movably disposed within the valve cage permits unidirectional flow of fluid through the bushing and valve cage and into the attached pipe. U.S. Pat. No. 2,274,968, dated Mar. 3, 1942, to Walter A. O'Bannon, details a "Blind Cage Valve", characterized by a cylindrical valve housing including a smooth internal bore. An annular valve seat positioned in the lower end of the bore has an axial fluid passageway extending therethrough. A ball valve is slidably disposed in the bore and a guide member slidably mounted in the bore is located in the upper end of the bore for receiving the upper portion of the ball valve. U.S. Pat. No. 2,937,659, dated May 24, 1960, to Jacob W. Harris, et al, describes a "Ball Valve Cage" including an elastomeric ball guide having an elastomeric projection or button fitted into a recess provided in the upper end of the valve cage, directly above an annular valve seat mounted in the lower end of the cage. Multiple, circumferentially-spaced guide elements extend downwardly from the elastomeric projection, abutting the walls of the valve cage. A valve ball is disposed in the valve cage between the guide elements, which serve to reduce wearing of the valve ball and the interior valve cage surface. U.S. Pat. No. 3,219,057, dated Nov. 23, 1965, to John G. Knowles, details "Check Valves", which include a cylindrical valve housing that accommodates a valve cage characterized by a single wire bent into a zig-zag configuration substantially circular in transverse cross-section with multiple, parallel, straight longitudinal portions having alternate end connection therebetween. A valve seat is provided on one end of the valve cage and a spring seated against the valve housing at the opposite end of the valve cage exerts pressure on a valve ball located in the valve housing, urging the ball to engage the valve seat. Unidirectional flow of a pressurized fluid is permitted through the valve seat and valve cage and out the opposite end of the housing. U.S. Pat. No. 3,724,496, dated Apr. 3, 1973, to Walter S. Secrist, discloses "Cage and Guide Construction for a Ball-Type Valve", characterized by a cylindrical valve cage including spaced-apart internal shoulders which have confronting grooves. Multiple guide pieces arranged in spaced relationship lie between the shoulders and have lips which engage the grooves to lock them in place. The guide pieces can be either metal or elastomer and are not distorted when inserted or removed. U.S. Pat. No. 3,827,122, dated Aug. 6, 1974, to Bobby L. Douglas, describes a "Check Valve Cage Apparatus and Method of Making Same", which check valve cage is fabricated by injecting a reinforced thermal setting plastic through a channel extending along the central longitudinal axis of a cylindrical body. A form pin is inserted through a coaxial longitudinal bore at the other end of the cylindrical body, the bore having an increased-diameter central portion for receiving the injected thermoplastic material. After the plastic material has set, lateral flow passages are formed in the wall of the cylindrical body. U.S. Pat. No. 4,091,839, dated May 30, 1978, to Verne P. Donner, details a "Ball Check Valve" characterized by a valve cage constructed of two spring wire pieces, each having two ball guiding legs attached by cross members formed with interfitting loops which hold the pieces together by spring tension. Each guiding leg is formed with a reverse bend extending outwardly and then rearwardly along the valve body walls, thus positioning the guide in the valve body. The cage is formed larger than the inside of the valve body in which it fits and also serves as a retainer for the ball valve spring. U.S. Pat. No. 4,243,067, dated Jan. 6, 1981, to Robert J. Rubey, details a "Ball Type Check Valve" characterized by a valve body including top and bottom flanges. The bottom flange is provided with inlet holes which are aligned with respective outlet holes provided in the top flange for fluid flowing through the valve. A ball is contained in the valve body and rests on a ball seat surrounding the inlet. A top plate positioned adjacent to the top flange has an opening therethrough which diverges concentrically toward the outlet opening and a ring-shaped ball stop which receives the ball when it is forced away from the ball seat by the fluid is positioned in the valve body, between the top plate and the top of the ball. U.S. Pat. No. 4,674,529, dated Jun. 23, 1987, to Sean M. Ferguson, discloses a "Check Valve" constructed of two housings or castings, each of which has a corrosion-resistant liner which provides improved support and operation of the ball or check member and increased resistance to linear collapse when operating under vacuum conditions.

Conventional ball-type valves generally utilize a valve cage which may be either of the close-side type, in which fluid enters one end of the valve and discharges at the opposite end, or of the open-side design, in which fluid discharges through slots in the sides. Because fluid is frequently pumped through the valve under high pressures and at high velocities and since ball check valves must be constructed of a wide variety of materials, there exists a need for the ball to be linearly guided as it moves within the cage, to prevent excessive oscillation and accompanying ball wear, as well as wear on the cage wall.

Accordingly, it is an object of this invention to provide a new and improved, low pressure drop ball check valve characterized by a valve cage having wall inserts which are resistant to the excessive wearing effects of the valve ball moving back and forth in the valve cage responsive to liquid flowing through the valve.

Another object of this invention is to provide a ball check valve characterized by long life, corrosion resistance and reduced maintenance and including a cylindrical valve housing containing a valve cage provided with multiple wear-resistant contact rods or members fixedly or rotatably mounted in spaced relationship with respect to one another around the circumference of the interior wall of the valve cage and extending longitudinally into the cage, for preventing excessive wearing of the valve ball and cage wall by receiving and linearly guiding the valve ball as it traverses the length of the valve cage responsive to fluid flowing through the valve.

Still another object of this invention is to provide a ball check valve having no welds and broad industrial application and including a valve cage characterized by multiple, wear-resistant contact rods fixedly or rotatably disposed in respective rod cavities shaped longitudinally in the interior surface of the valve cage wall in circumferentially-spaced, parallel relationship with respect to one another, which contact rods extend longitudinally into the valve cage, contact the valve ball and prevent the valve ball from excessively oscillating and wearing the ball and interior surface of the valve cage wall by guiding the valve ball as the valve ball traverses the valve cage responsive to fluid flow through the valve.

SUMMARY OF THE INVENTION

These and other objects of the invention are provided in a ball check valve characterized by a cylindrical valve housing including an interior valve cage provided with multiple cobalt alloy contact rods which in one embodiment are fixedly mounted in respective rod cavities shaped longitudinally in the valve cage wall in spaced, parallel relationship with respect to one another around the interior circumference of the wall and extend longitudinally into the valve cage interior to contact and guide the ball and prevent excessive wearing of the ball and the valve cage wall as the ball traverses the valve cage responsive to fluid flow through the valve. In another embodiment of the invention the contact rods are rotatably disposed in the respective rod cavities to present a varying contact surface to the ball, reduce rod wear and ball oscillation and thus prolong the life of the contact rods and the ball.

BRIEF DESCRIPTION OF THE DRAWING

These and other objects of the invention will be better understood by reference to the accompanying drawing, wherein:

FIG. 1 is a perspective view of a preferred embodiment of the assembled ball check valve of this invention;

FIG. 2 is a sectional view of the ball check valve, taken along section lines 2—2 in FIG. 1;

FIG. 3 is an exploded, perspective view of the ball check valve illustrated in FIGS. 1 and 2;

FIG. 4 is a sectional view of a first preferred embodiment of the ball check valve, taken along section lines 4—4 in FIG. 2;

FIG. 5 is a sectional view of a second preferred embodiment of the ball check valve, taken along section lines 4—4 in FIG. 2;

FIG. 6 is a sectional view of a third preferred embodiment of the ball check valve, taken along section lines 4—4 in FIG. 2;

FIG. 7 is an enlarged sectional view of the ball check valve, enlarged at section circle 7 in FIG. 4 and more particularly detailing a fixed-rod embodiment of the ball check valve;

FIG. 8 is an enlarged sectional view of the ball check valve, enlarged at section circle 7 in FIG. 4 and more particularly detailing a rotatable-rod embodiment of the ball check valve;

FIG. 9 is an enlarged sectional view of a fourth preferred embodiment of the ball check valve, enlarged at section circle 7 in FIG. 4; and FIG. 10 is an enlarged sectional view of a fifth preferred embodiment of the ball check valve, enlarged at section circle 7 in FIG. 4.

DESCRIPTION OF THE PREFERRED EMBODIMENT

Referring initially to FIGS. 1–4 of the drawing, in a first preferred embodiment of the invention the ball check valve is generally illustrated by reference numeral 1. The ball check valve 1 includes a generally cylindrical check valve housing 2 characterized by a continuous housing wall 3, defining an interior valve bore 8, traversing the length of the check valve housing 2. A narrowed pipe nipple 6, provided circumferentially with multiple, exterior nipple threads 7 for threadable connection with a fluid flow system pipe or conduit (not illustrated) is shaped in the upper end of the check valve housing 2. The exterior surface of the housing wall 3 includes a pair of diametrically-spaced, rectangular depressions or wrench flats 25, for engagement with a wrench (not illustrated) and removably connecting the ball check valve 1 with a fluid flow system pipe or conduit (not illustrated). Multiple internal cage threads 9 are provided circumferentially in the lower end of the interior surface of the housing wall 3. A valve cage 4 is included in the valve bore 8 between the wrench flats 25 and cage threads 9. A disc-shaped ball stop 11, including four circumferentially-spaced fluid passages 12 traversing the thickness thereof and having a concave face, is mounted in the valve bore 8 or integrally formed with the housing wall 3, between the valve cage 4 and pipe nipple 6. As illustrated in FIG. 2, a ball 15 is accommodated in the valve cage 4. An annular ball seat 16, formed with a central seat opening 17a and concave seat face 17 for receiving the ball 15, is removably positioned in the valve bore 8, adjacent to the ball 15.

A generally cylindrical bushing 18, characterized by a continuous bushing wall 19, defining an interior bushing bore 21, which longitudinally transverses the length of the bushing 18, is provided with external bushing threads 20 at the top end thereof. A pair of diametrically-spaced wrench flats 25 are provided on the exterior surface of the bushing wall 19. The interior surface of the lower end of the bushing wall 19 is provided circumferentially with multiple line threads 22 for attaching the bushing 18 to a fluid flow system pipe or conduit (not illustrated). As illustrated in FIGS. 1 and 2, the bushing 18 is threadably connected to the check valve housing 2 by linearly aligning the bushing 18 with the check valve housing 2 and engaging the external bushing threads 20 with the internal cage threads 9 by rotating the bushing 18 in a clockwise direction, such that the bushing 18 abuts the bottom end of the check valve housing 2, defining a match line 26 where the bushing 18 meets the check valve housing 2. The upper end of the bushing 18 receives and seats a removable ball seat 16, securing it in the valve bore 8 and bushing bore 21 beneath the ball 15.

Referring now to FIGS. 2, 4 and 7 of the drawing, in a first preferred embodiment of the invention three elongated, cylindrical contact rods 10 are fixedly mounted in respective rod cavities 14, bored or shaped in the housing wall 3 in spaced relationship with respect to one another around the interior circumference of the housing wall 3 and traversing the length of the valve cage 4. A longitudinal segment, less than one-half of the surface area of each contact rod 10, extends into the valve bore 8 and contacts the ball 15, preventing the ball 15 from contacting the housing wall 3. An indentation or fluid flow notch 13 is shaped in the housing wall 3 between each pair of contact rods 10 to enlarge the flow area through the valve bore 8. At least three contact rods 10 are required to contact and longitudinally stabilize the ball 15 against excessive oscillation and prevent the ball 15 from contacting and wearing the housing wall 3.

Referring now to FIGS. 4 and 8 of the drawing, in a most preferred aspect of the first preferred embodiment of the invention each contact rod 10 is rotatably disposed in a circumferentially-enlarged rod cavity 14. A longitudinal segment, less than one-half of the surface area of each contact rod 10, extends longitudinally into the valve bore 8 to contact the ball 15 and rotate incrementally and randomly as the ball 15 moves longitudinally in the valve cage 4, to present a variable contact surface to the ball 15 and thus prolong the life of the contact rods 10 as well as the ball 15.

Referring next to FIG. 5 of the drawing, in a most preferred embodiment of the invention eight elongated, cylindrical contact rods 10 are fixedly mounted in respective rod cavities 14 to provide optimum wearing protection to the housing wall 3. As in the previous embodiment, the rod cavities 14 are shaped in the housing wall 3 in spaced relationship with respect to one another around the interior circumference of the housing wall 3 and traverse the length of the valve cage 4. As described above, in a most preferred aspect of this embodiment, each rod cavity 14 is circumferentially enlarged to allow free rotation of the corresponding contact rod 10 as the ball 15 moves in the valve cage 4, presenting a variable contact surface to the ball 15 and thus prolonging the life of the contact rods 10 and the ball 15.

Referring now to FIG. 6 of the drawing, in yet another preferred embodiment of the invention the valve bore 8 is shaped in hexagonal cross-section and six elongated, cylindrical contact rods 10 are fixedly mounted in respective rod cavities 14, each of which is shaped in the housing wall 3 and traverses the length of the valve cage 4 at substantially the midpoint of a corresponding flat surface of the hexagonal valve bore 8. Each junction of two adjacent flat surfaces of the valve bore 8 defines a flow notch 13. As in the previous embodiments, in a most preferred aspect, the contact rods 10 are rotatably disposed in respective circumferentially-enlarged rod cavities 14.

Referring to FIG. 9 of the drawing, in another preferred embodiment of the invention each contact rod 10 is shaped in square cross-sectional configuration. Each contact rod 10 may be one of three contact rods 10 arranged as illustrated in FIG. 4, one of eight contact rods 10 arranged as illustrated in FIG. 5 or one of six contact rods 10 arranged as illustrated in FIG. 6, in non-exclusive particular.

Referring finally to FIG. 10 of the drawing, in a still further preferred embodiment of the invention each contact rod 10, shaped in triangular cross-sectional configuration, may be one of three contact rods 10 arranged as illustrated in FIG. 4, one of eight contact rods 10 arranged as illustrated in FIG. 5 or one of six contact rods 10 arranged as illustrated in FIG. 6, in non-exclusive particular.

It will be appreciated by those skilled in the art that the ball check valve 1 of this invention can be constructed of substantially any desired material, including plastic of desired composition and character, depending upon industrial application. This selective variety is possible because of the contact rods 10, which receive and guide the ball 15 throughout the range of ball travel in the valve cage 4, regardless of the chosen material of construction of the check valve housing 2 or valve cage 4. Accordingly, under circumstances where the service environment application is abrasive or highly corrosive, a highly temperature and corrosion-resistant material such as cobalt alloy may be used to shape the contact rods 10, according to the knowledge of those skilled in the art. Other materials for various industrial applications include ceramics, stainless steel, nickel and the like, in non-exclusive particular. The wear resistance of these materials is greatly enhanced under circumstances where the contact rods 10 are mounted in oversized rod cavities 14, as illustrated in FIG. 1, to facilitate random rotation of the contact rods 10 in the rod cavities 14, as described above.

The ball check valve of this invention is uniquely designed to facilitate check valve service in substantially any fluid flow system and configuration and can be constructed of any desired material, of any size and in high temperature and/or corrosive environments. Furthermore, the ball check valve may utilize a free-floating or spring-loaded ball, as desired.

Accordingly, while the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A ball check valve for accommodating the unidirectional flow of a liquid, comprising an elongated, cylindrical valve housing having a longitudinal bore; a ball stop provided in said bore and having a plurality of flow openings for accommodating said unidirectional flow of the liquid; a ball seat disposed in said valve housing in spaced relationship with respect to said ball stop; a ball disposed in said valve housing bore and movable between said ball seat and said ball stop; a plurality of elongated rod openings provided in said valve housing, said rod openings communicating with said valve housing bore; and a plurality of elongated contact rods seated in spaced, substantially parallel relationship with respect to each other in said rod openings in said valve housing, with a portion of said contact rods extending from said rod openings in said valve housing into said valve housing bore between said ball stop and said ball seat for engaging said ball, whereby said ball remains in contact with said portion of said contact rods when said ball moves between said valve seat and said valve stop, responsive to the flow of the liquid through said valve housing bore.

2. The ball check valve of claim 1 wherein said plurality of elongated, cylindrical contact rods further comprises eight contact rods spaced substantially equidistant from each other in said valve housing.

3. A ball check valve for preventing reverse flow of a liquid, comprising a valve housing having a longitudinal bore; a ball seat disposed in said valve housing bore; a ball stop provided in said valve housing bore in spaced relationship with respect to said ball seat and at least one flow opening provided in said ball stop for accommodating the liquid; a ball disposed in said valve housing bore and movable between said ball seat and said ball stop; at least three rod bores provided in said valve housing, said rod bores communicating with said valve housing bore; and at least three cylindrical contact means having a diameter undersized with respect to the diameter of said rod bores, said contact means inserted in said rod bores in said valve housing in spaced relationship with respect to each other, with a segment of said contact means extending from said rod bores into said valve housing bore between said ball stop and said ball seat, for engaging said ball, whereby said ball remains in contact with said segment of said contact means when said ball moves between said valve seat and said valve stop.

4. The ball check valve of claim 3 wherein said at least three contact means comprises eight cylindrical contact rods.

\* \* \* \* \*